United States Patent Office 2,737,533
Patented Mar. 6, 1956

2,737,533

INHIBITION OF TETRAFLUOROETHYLENE POLYMERIZATION

Barnard Mitchel Marks and John Brockway Thompson, Wilmington, Del., assignors to E. I. du Pont de Nemours and Company, Wilmington, Del., a corporation of Delaware No Drawing. Application August 3, 1954,
Serial No. 447,681

5 Claims. (Cl. 260—653)

This invention relates to a method of preventing the premature polymerization of tetrafluoroethylene and more particularly to a method of stabilizing tetrafluoroethylene against polymerization by addition of inhibitor compounds. This invention is also directed to novel compositions of matter comprising monomeric tetrafluoroethylene and a polymerization inhibitor, which exhibits advantages over the properties of the inhibitors heretofore employed for this purpose.

Tetrafluoroethylene, being a very reactive compound, polymerizes to form a solid polymeric material after standing a few days at room temperature under superatmospheric pressures, in accordance with the teachings of United States Patent 2,230,654. It therefore becomes necessary to store tetrafluoroethylene, whether it is in the form of a gas or a liquid, by methods which will prevent this spontaneous polymerization at room temperature and superatmospheric pressures. There are several methods by which the stabilization of tetrafluoroethylene can be accomplished. Most of these have been revealed in United States Patents 2,407,396, 2,407,405, and 2,407,419 and are in essence methods by which tetrafluoroethylene is stabilized with small amounts of compounds acting as inhibitors for the polymerization of tetrafluoroethylene at normal temperatures under superatmospheric pressures.

Compounds heretofore described as inhibitors fall in general into the classes of hydrocarbon thiols, ethylenically unsaturated hydrocarbons, and aminohydrocarbons. This of course encompasses a very large number of compounds. The most outstanding and most effective of the inhibitors for this purpose have been certain terpene hydrocarbons. However, even these preferred prior art inhibitors exhibited certain disadvantages which heretofore it has not been possible to overcome, even after many years of investigation and study. Some of the unsaturated inhibitors, such as alkenes, do not inhibit the polymerization of tetrafluoroethylene for a sufficiently long time. On the other hand, those inhibitors which are most effective from the standpoint of providing protection for a prolonged period of time (particularly the terpene hydrocarbons) exhibit a disadvantage which seemingly parallels their ability to provide prolonged protection, this disadvantage being their characteristic property of forming gums while scavenging small amounts of oxygen from the monomer composition, as hereinbelow explained in greater detail. Still other inhibitors, which are otherwise effective, have a tendency to corrode the metal containers and pipes used in the storage and transportation of tetrafluoroethylene and thereby introduce impurities. Other inhibitors, such as the thiols, are unduly toxic. Until the present invention, no specific compounds have been known, which will avoid all these undesirable features in the stabilization of monomeric tetrafluoroethylene.

It is an object of this invention to stabilize monomeric tetrafluoroethylene against polymerization by the addition of a compound which will inhibit the polymerization for substantially as long a time as the best of the prior art inhibitors, yet will not change its physical form, i. e., change from a non-viscous liquid to a gum or solid, when acting as a stabilizer.

Another object of this invention is to stabilize tetrafluoroethylene against polymerization by the addition of a compound which can be removed from said tetrafluoroethylene by distillation or adsorption.

These and other objects hereinafter apparent are accomplished in accordance with this invention by admixing monomeric tetrafluoroethylene with a sufficient amount of a member of the class consisting of alpha-methylvinyl benzene, and alpha-methylvinyl methylbenzenes to prevent polymerization of the tetrafluoroethylene.

We have now discovered that compounds of the class defined above are not only excellent stabilizers, preventing the polymerization of tetrafluoroethylene at normal temperatures and under superatmospheric pressures, for surprisingly long periods of time, but in addition do not change their physical form to become viscous liquids or gums whilst inhibiting the polymerization of tetrafluoroethylene. Furthermore, these compounds do not corrode metal equipment, can be analyzed readily by ultraviolet light absorption, since the benzene ring of said stabilizing compounds is not involved in reactions with oxygen, and are relatively non-toxic.

It is known that the spontaneous polymerization of tetrafluoroethylene occurs because of the presence, in the tetrafluoroethylene, of small quantities of oxygen, which initiate the polymerization of tetrafluoroethylene. Thus a compound will stabilize monomeric tetrafluoroethylene, if the prevalent oxygen will react with that compound in preference to tetrafluoroethylene. Unsaturated compounds will react with oxygen at fast rates. As hereinabove mentioned, most of the compounds that react at rates faster than tetrafluoroethylene with oxygen have the serious disadvantage that they themselves form polymerization products or degradation products which are capable of polymerizing under the prevailing conditions. Accordingly one of the achievements of the present invention is the discovery of compositions in which the inhibitor is capable of reacting with oxygen faster than does the tetrafluoroethylene, but in doing so the inhibitor does not form undesirable gums, being inherently inert against further reaction with its own species or with tetrafluoroethylene.

The concentration in which these stabilizers are most effective depends on the concentration of oxygen present in the tetrafluoroethylene. Broadly speaking, these stabilizers are employed in amounts ranging from about 0.01% to 10% based on the amount of tetrafluoroethylene. In most cases, however, these stabilizers are employed in quantities of 0.01% to 0.5% by weight, based on the amount of tetrafluoroethylene.

The following examples, in which proportions are in parts by weight unless otherwise stated, are given to further illustrate the merits of this invention and are not intended to limit the scope of this invention. In these examples, the method of testing the tetrafluoroethylene was to introduce known amounts of oxygen, inhibitor, tetrafluoroethylene and iron filings into heavy-walled glass tubes which on sealing were stored at room temperature. These tubes were then inspected by means of strong light at set intervals for any visible signs of polymer formation or other effects, such as gum formation or rust formation. When polymer formation occurred in these tests, it could be detected by observing a white solid deposited on the iron filings or suspended in the liquid tetrafluoroethylene. When gum formation occurred it could be detected by observing brownish deposits on the walls or elsewhere in the mixture. In order to make the test more effective, critical conditions, i. e., high oxygen concentration and relatively low inhibitor concentration were employed. The iron filings were introduced to simulate the effect of the metal surfaces of ordinary storage containers. The amount of iron filings corresponded approximately with the ratio of tetrafluoroethylene to metal surface, normally encountered in the storage or shipment of tetrafluoroethylene.

*Example 1.*—To each of thirteen glass tubes 0.1 gram iron filings were added. Then 0.01%, based on the tetrafluoroethylene to be added, of the following twelve compounds were metered individually into the tubes with the aid of an ultra-micro buret. These were: (1) Terpene B, essentially a mixture of dipentene and terpinolene, (2) alpha-pinene, (3) "Solvanol" 2, principally a mixture of terpinolene and other monocyclic terpenes, (4) alpha-methylvinyl ortho-methylbenzene, (5) alpha-methylvinyl para-methylbenzene, (6) alpha-methylvinyl meta-methylbenzene, (7) a mixture of alpha-methylvinyl para- and meta-methylbenzene, (8) secondary butyl benzene, (9) mesitylene, (10) cumene, (11) p-cymene, and (12) diisopropylbenzene. The thirteenth tube was tested without inhibitor. Tetrafluoroethylene containing less than 5 p. p. m. oxygen was then mixed with 50 p. p. m. additional oxygen and the mixture was introduced into the glass tube. The glass tube having been previously filled with the iron filings and the inhibitor to the extent indicated above was cooled to liquid air temperatures. After 10 grams of the mixture had condensed in the glass tube the tube was sealed off and stored at room temperature and thereafter examined periodically. This procedure was repeated for all of the twelve compounds. Duplicate sample tubes for each compound were made. The results of these experiments have been summarized in Table I. The numbers in the table are the days the tetrafluoroethylene was stored without any formation of polymer. The figures that are starred indicate that only one of the two samples failed at that particular time, whereas the other, even at the prolonged time of these particular tests, had still not yet shown any evidence of polymerization of tetrafluoroethylene.

*Table I*

| Stabilizer | Days Without Signs of Polym. | Gum Formation | Corrosion |
| --- | --- | --- | --- |
| Terpene B | 30 | yes | Rust formation in 45 days. |
| alpha-pinene | 320 | yes | Rust formation in 60 days. |
| Solvanol-2 | 150 | yes | Rust formation in 60 days. |
| alpha-methylvinyl ortho-methylbenzene. | 260* | no | No rust formation. |
| alpha-methylvinyl meta-methylbenzene. | 72 | no | Do. |
| alpha-methylvinyl paramethylbenzene. | 100* | no | Do. |
| alpha-methylvinyl para- and meta-methylbenzene. | 240* | no | Do. |
| Second. butyl benzene | 4 | no | Do. |
| Mesitylene | 1 | no | Do. |
| Cumene | 2 | no | Do. |
| Diisopropylbenzene | 2 | no | Do. |
| p-Cymene | 1 | | Do. |
| No inhibitor | 1 | | Do. |

*Example 2.*—Using the procedure employed in Example 1, the hereinbelow listed compounds were tested as inhibitors for the spontaneous polymerization of tetrafluoroethylene in 0.2% quantities. All other conditions were the same as in Example 1. Similarly to Table I results have been summarized in Table II:

*Table II*

| Compound | Days Without Signs of Polym. | Gum Formation |
| --- | --- | --- |
| Terpene B | more than 300 | yes. |
| alpha-pinene | do | yes. |
| Solvanol-2 | do | yes. |
| alpha-methylvinyl ortho-methylbenzene | do | no. |
| alpha-methylvinyl meta-methylbenzene | do | no. |
| alpha-methylvinyl paramethylbenzene | do | no. |
| alpha-methylvinyl para and meta-methylbenzene. | do | no. |

The wide liquid temperature range of the hereinabove illustrated inhibitors coming within the class of inhibitors also hereinabove described as members of the class consisting of alpha-methylvinylbenzene and alpha-methylvinyl-methylbenzenes facilitates the removal of said inhibitors by simple distillation, which lowers the inhibitor concentration to below 1 p. p. m. In fact, in one of the most practical aspects of the invention, the inhibited composition is stored until required for the use in making polymer, at which time it is distilled to lower the inhibitor concentration to below 1 p. p. m. as measured by ultraviolet adsorption methods. Monomer composition suitable for conversion to polymer must be free of inhibitor to below 1 p. p. m. as measured by ultraviolet adsorption methods in order to obtain fast rates of reaction and produce polymer of good physical properties. The inhibitor, like other compounds containing hydrogen, interferes in the polymerization by scavenging free radicals and reacts with growing polymer chains to give telomerized polymers, which have poor properties. When the inhibitor is removed to below 1 p. p. m. such telomers do not form to any significant extent. Thus an additional incidental advantage gained by using the inhibitors of this invention is the ease of detection of minute quantities of the inhibitor in streams of tetrafluoroethylene. This is significant for the further reason that it is desirable to examine the compositions as a safety measure under particular circumstances to check the fact that inhibitor is contained therein. It is known that the benzene ring has a strong adsorption band in the ultraviolet spectrum, which is well suited to make detection of minute quantities containing such a benzene ring possible.

This is shown in Table III where relative adsorptivity of prior art inhibitors or their components are compared to inhibitors of the present invention. Measurements were carried out in dilute solutions of methanol containing 1 milligram of inhibitor compound to 10,000 milliliter of solvent.

*Table III*

| Inhibitors: | Adsorptivity |
| --- | --- |
| Terpene B | 37.5 |
| Components thereof which have been identified: | |
| Terpinolene | 1.95 |
| Dipentene | 13.0 |
| Alpha-pinene | 0.5 |
| "Solvanol" 2 (Hercules Powder Co.) | 5.1 |
| Mixture of alpha-methylvinyl para- and meta-methylbenzene | 65 |
| Dipentine | 0.6 |
| Alpha-terpineol | 0.82 |

Although Terpene B has a relatively high ultra-violet adsorptivity this is not due to the known inhibiting components, hence in the case of Terpene B ultraviolet adsorption is not a reliable measure of the concentration of inhibitor. Ethylenically unsaturated aliphatic or cycloaliphatic compounds such as the presently preferred terpene hydrocarbons are on the other hand not as easily detected and the detection thereof is made even more difficult when these aliphatic or cycloaliphatic compounds have undergone reaction with oxygen.

The present invention is useful in that it stabilizes tetrafluoroethylene against polymerization for long periods of time, so that it can be stored and transmitted through small diameter high pressure tubes and valves, without formation of gummy oxidation products from the stabilizers added, which tend to plug said lines and valves. The stabilizers employed in the practice of this invention are, furthermore, relatively non-toxic, non-corrosive compounds, which can be prepared in a high degree of purity and are easily detected by well known analytical methods.

We claim:

1. A composition of matter comprising monomeric tetrafluoroethylene and from 0.01 to 10% by weight of the tetrafluoroethylene of inhibitor to prevent polymerization thereof, said inhibitor being a member of the class consisting of alpha-methylvinylbenzene and alpha-methylvinylmethylbenzenes.

2. A composition of claim 1 wherein the said inhibitor is alpha-methylvinyl-ortho-methylbenzene.

3. A composition of claim 1 wherein the said inhibitor is alpha-methylvinyl meta-methylbenzene.

4. A composition of claim 1 wherein the said inhibitor is alpha-methylvinyl para-methylbenzene.

5. A composition of claim 1 wherein the said inhibitor is a mixture of alpha-methylvinylmethylbenzenes.

No references cited.